United States Patent
Spahn

(10) Patent No.: US 7,427,749 B2
(45) Date of Patent: Sep. 23, 2008

(54) METHOD FOR CORRECTING BUTTING ZONE ARTIFACTS WITH AN X-RAY DETECTOR AND AN X-RAY DETECTOR

(75) Inventor: Martin Spahn, Chicago, IL (US)

(73) Assignee: Siemens Aktiengesellschaft, Munich (DE)

( * ) Notice: Subject to any disclaimer, the term of this patent is extended or adjusted under 35 U.S.C. 154(b) by 1 day.

(21) Appl. No.: 11/484,159

(22) Filed: Jul. 11, 2006

(65) Prior Publication Data

US 2007/0007447 A1 Jan. 11, 2007

(30) Foreign Application Priority Data

Jul. 11, 2005 (DE) .................... 10 2005 032 275

(51) Int. Cl.
*G01D 18/00* (2006.01)
(52) U.S. Cl. .................... 250/252.1; 378/98.8
(58) Field of Classification Search ............ 250/252.1; 378/98, 98.2, 98.3, 98.4, 98.5, 98.6, 98.7, 378/98.8, 98.9, 98.1, 98.11, 98.12, 207; 356/638
See application file for complete search history.

(56) References Cited

U.S. PATENT DOCUMENTS

| | | | | |
|---|---|---|---|---|
| 5,528,043 | A * | 6/1996 | Spivey et al. | 250/370.09 |
| 5,886,353 | A * | 3/1999 | Spivey et al. | 250/370.09 |
| 6,418,241 | B1 * | 7/2002 | Schreiner | 382/263 |
| 6,718,011 | B2 * | 4/2004 | Spahn | 378/98.8 |
| 6,854,885 | B2 * | 2/2005 | Wischmann et al. | 378/207 |
| 2003/0016788 | A1 * | 1/2003 | Spahn | 378/98.8 |
| 2004/0200971 | A1 * | 10/2004 | De Keyser | 250/370.09 |
| 2006/0291626 | A1 * | 12/2006 | Hornig | 378/98.8 |

FOREIGN PATENT DOCUMENTS

DE 101 35 427 A1 2/2003

\* cited by examiner

*Primary Examiner*—David P. Porta
*Assistant Examiner*—Kiho Kim

(57) ABSTRACT

The invention relates to a method for correcting butting zone artifacts with an x-ray detector, which comprises a number of laminar detector modules arranged next to one another by forming a butting zone. To improve a known algorithm, it is proposed to determine a necessary correction width for measuring fields on the basis of a correction image.

6 Claims, 2 Drawing Sheets

METHOD FOR CORRECTING BUTTING ZONE ARTIFACTS WITH AN X-RAY DETECTOR AND AN X-RAY DETECTOR

CROSS REFERENCE TO RELATED APPLICATIONS

This application claims priority of German application No. 10 2005 032 275.1 filed Jul. 11, 2005, which is incorporated by reference herein in its entirety.

FIELD OF THE INVENTION

The invention relates to a method for correcting butting zone artifacts with an x-ray detector. It relates further to an x-ray detector suited to implementing the method.

BACKGROUND OF THE INVENTION

Such a method is known from DE 101 35 427 A1. According to the prior art, large-area x-ray detectors comprise several laminar detector modules. The detector modules are usually of a square or rectangular design. To produce a large detector area, the detector modules are assembled in parallel to the edges. A so-called butting zone forms in the region of the edges arranged next to one another, in which butting zone the signal transport characteristics are different to inside the detector module. In the region of the butting zone, the optical characteristics are changed for instance by the presence of an adhesive and by a large distance from the pixels to the detector modules arranged next to one another. Consequently, the pixels in the region of the butting zone supply erroneous signals which effect so-called butting zone artifacts in the image. To correct butting zone artifacts of this type in the region of the butting zone in each detector module, gray-scale values in measuring fields of predetermined variables arranged on the edge side facing one another are measured. A suitable algorithm allows the most erratically changing gray-scale values to be changed such that in the region of the butting zone, a continuous transition of gray-scale values takes place.

Practice has shown that the developing butting zone artifacts vary considerably. With the algorithm used for correction purposes, large measuring fields are consequently used, so that the most significant signal deviation occurring in the butting zone can thus also be corrected. This however disadvantageously results in an unnecessarily large region of the peripherally arranged pixels being subject to a correction in the event of weakly developed signal deviations. This in turn results in a loss of image information.

SUMMARY OF THE INVENTION

The object of the invention is to eliminate the disadvantageous according to the prior art. In particular, a method and an x-ray detector are to be specified which allow a precise correction of butting zone artifacts. With the correction, manufacturing-dependent quality differences of the detector modules are particularly to be considered.

This object is achieved by the features of the independent claims. Expedient embodiments result from the features of the dependent claims.

According to the invention, with a method for correcting butting zone artifacts with an x-ray detector the following further steps are provided.

Determining a difference between the first and second gray-scale values as a function of the correction length based on a calibration image, Determining for the first and second measuring field a minimal correction width extending in each instance inside the respective detector module based on predetermined parameters and the determined difference and Correcting the first and second gray-scale values according to the predetermined algorithm using the minimal correction width.

The proposed method allows an especially precise correction of butting zone artifacts. Here manufacturing-dependent quality differences of detector modules are considered. In other words, good quality detector modules are subject to a minimal correction only to the necessary degree, whereas comparatively low quality detector modules are subject to a more significant correction.

To implement the correction, the determination of the difference between the first and second gray-scale values as a function of the correction length based on a calibration image and finally the determination of a minimal correction width for each of the measuring fields based on the predetermined parameters and the determined difference are only needed once. A specific correction pattern is thus generated for the detector module, with which correction pattern a minimal correction width is determined as a function of predetermined parameters. The minimal correction width is determined based on predetermined parameters. The proposed method avoids the use of a constant correction width which is selected too large in many cases and thereby a certain loss of image information in the region of the butting zone. The first and second gray-scale values according to the predetermined algorithm can be corrected rapidly and in a simple manner with the generation of an image using the minimal correction width.

According to an advantageous embodiment, the first and/or the second measuring field comprises several pixels and the correction length corresponds at least to the length of a pixel. In other words, a minimal correction width can be determined for each row of pixels from the butting line to the interior of the detector module. The minimal correction width corresponds at least to the width of a pixel. It can however also comprise several pixels. It is naturally also possible for the correction length to comprise several pixels. Said correction length is however expediently the same length for each measuring field.

According to a particularly advantageous embodiment, the minimal correction widths and the correction lengths corresponding thereto in each instance are stored in a table. Expediently, the storage is carried out electronically in a storage chip or in another suitable storage means, for instance a hard disk and such like. Advantageously, a further parameter relating to the correction height is stored in the table in addition to value pairs comprising minimal correction widths and correction lengths corresponding thereto. The correction height can be a maximum correction height which can be a function of an average local signal. In a simple case, the maximum correction height is dependent linearly on an applied dose.

According to a further measure of the invention, provision is made in an x-ray detector for a storage means, in which is stored a table with parameters for the detector-specific correction of butting zone artifacts. The provision of the storage means allows the detector to be operated in a simple manner. It can readily be replaced with another detector. To implement the claimed correction of butting zone artifacts, it is possible to read out the parameters stored in the storage means and to correct the signals according to the claimed method supplied by the detector for correcting butting zone artifacts. The minimal correction widths and the correction lengths corresponding in each instance thereto can be stored in the table as parameters. Furthermore, a further parameter relating to the correction height can be stored in the table in addition to value pairs comprising minimal correction width and correction length corresponding thereto.

BRIEF DESCRIPTION OF THE DRAWINGS

An exemplary embodiment of the invention is described in more detail below with reference to the drawing in which.

DETAILED DESCRIPTION OF THE INVENTION

Figure 1:
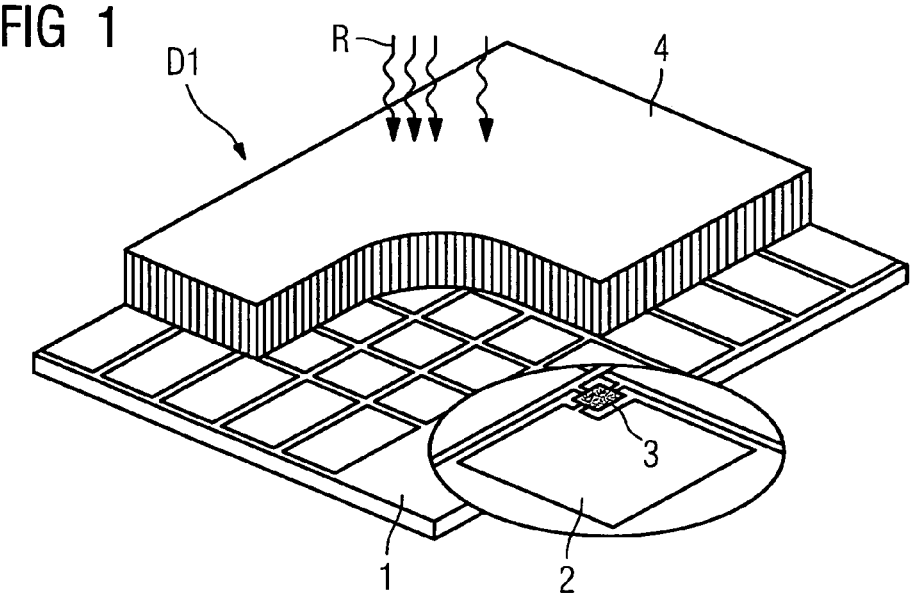
FIG. 1 shows a partially broken perspective view of a detector module.

By way of example, FIG. 1 shows a partially broken perspective view of some essential components of a detector module D1. A plurality of photo diodes 2 are provided on a substrate 1 according to a type of matrix formed from lines and columns. Each of the photo diodes 2 comprises a switch 3, which allows a selective read out of charge signals. A converter layer formed for instance from a scintillator and/or CsI is identified with reference character 4. The converter layer 4 converts incident x-rays R into visible light, which is in turn detected by the photo diodes 2 arranged therebelow.

Figure 2:
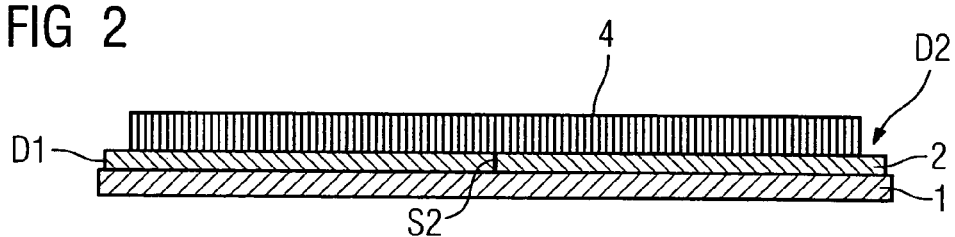
FIG. 2 shows a schematic cross-sectional view through an x-ray detector.
Figure 3:
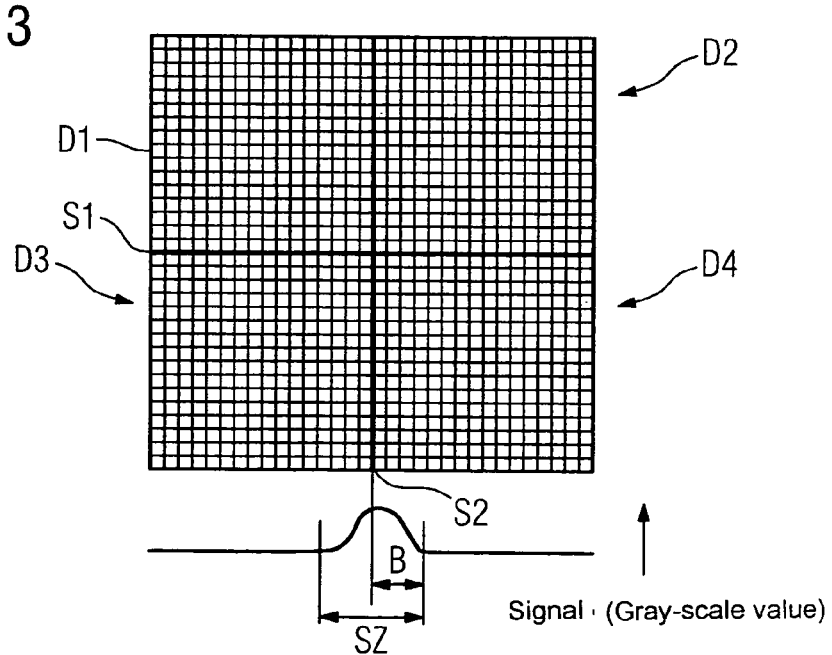
FIG. 3 shows a top view on an x-ray detector according to FIG. 2.

FIGS. 2 and 3 shows a large area x-ray detector, which is produced from several detector modules D1, D2 and/or D1 to D4 arranged in parallel to the edges. The detector modules D1, . . . ,D4 abut each other along the butting lines S1, S2. The detector modules D1, . . . ,D4 can touch each other in the region of the butting lines S1, S2. FIG. 3 further shows the path of a signal in the region of a butting zone SZ comprising the butting lines S1, S2. It can be seen that the signal is in across a width B extending from the butting line S1, S2 to the inside of the detector D1, D2. The change in the signal in the region of the butting zone SZ results in the formation of butting zone artifacts.

DE 101 35 427 A1 describes an algorithm, with which butting zone artifacts of this type can be corrected. The known algorithm relates to the evaluation of measuring fields, which comprise a predetermined correction width and length. A predetermined correction width and length can comprise 4 to 6 pixels for instance. Due to the details of the algorithm known according to the prior art, reference is made to the disclosure content of DE 101 35 427 A1, which is included here.

Figure 4:
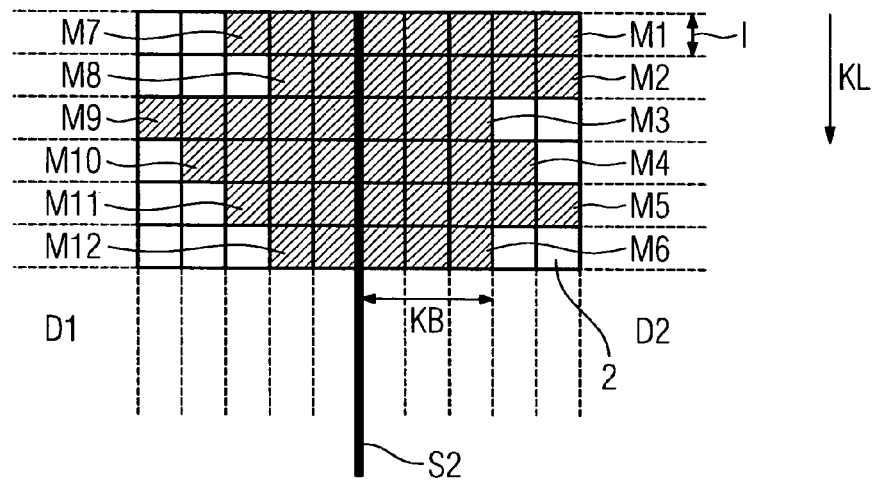
FIG. 4 shows a detailed view according to FIG. 3.

FIG. 4 shows an enlarged segment according to FIG. 3. Measuring fields M1, . . . ,M12 provided in accordance with the invention are display hatched in FIG. 4. Each of the measuring fields M1, . . . ,M12 comprises a correction length KL, which corresponds here to the length 1 of a pixel. A minimal correction width KB extending from the butting line S2 to the inside of a detector element D1, D2 is variable. It can comprise 2 to 5 pixels in the example shown. In accordance with the invention, the use of the algorithm known according to the prior art can thus be restricted to measuring fields M1, . . . ,M12, the variable of which is restricted to a region actually to be corrected.

To determine the minimal correction width KB, a calibration image is first produced. This can be an offset-corrected x-ray image. On the basis of such a correction image, it is possible to detect how the signals of the pixels in the region of the butting zone SZ differ from signs in the interior of the detector modules D1, . . . ,D4. On the basis of predetermined parameters, a minimal correction width KB can subsequently be determined according to predetermined criteria. The corresponding correction length KL comprises at least the length of a pixel. It can however also comprise a plurality of the lengths of a pixel. Expediently, a correction length KL of the measuring field M1, . . . ,M12 is constant.

The determined minimal correction widths KB and the correction lengths KL corresponding thereto can be stored in a table.

According to a further embodiment of the method, it is possible to determine the extent of the deviations of the signals in the region of the butting zone SZ. A maximum correction value for the individual pixel can thus be determined for instance. The correction value can likewise be stored in the table for each pixel to be corrected in the region of the butting zone SZ.

Figure 5:
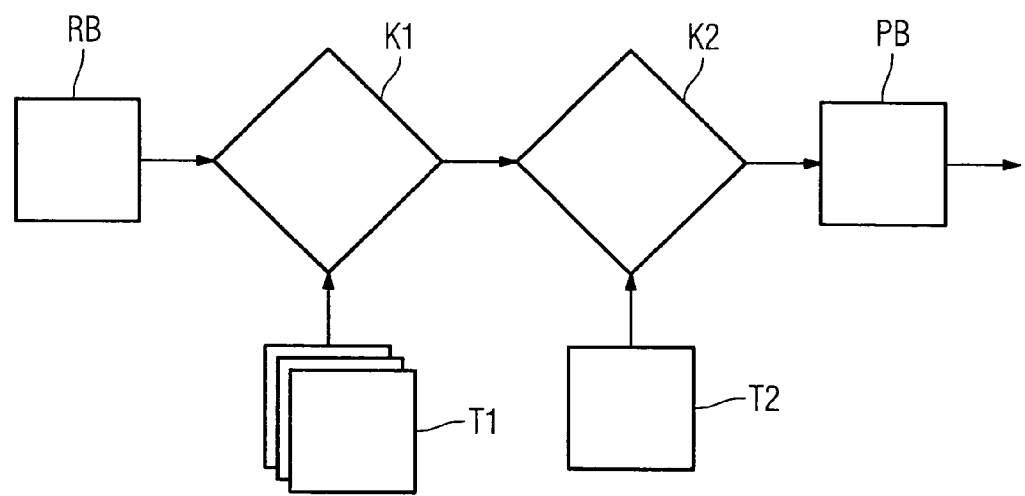
FIG. 5 shows a schematic representation of a correction method.

FIG. 5 shows a possible integration of the proposed method in a complex collection method. Subsequently a raw image RB is first subject to an offset correction, gain correction and defect correction K1. Correction information stored in table T1 is referred back to here. The method according to the invention identified with the reference character K2 can subsequently be implemented for butting zone correction. Reference is reverted back here to information stored in a table T2, in particular the minimal correction widths KB as a function of the correction lengths KL as well as maximum correction heights. An extensively artifact free corrected image PB is generated as a result

The invention claimed is:

1. A method for correcting a butting zone artifact with a plurality of x-ray detector modules, comprising:
    forming a plurality of butting lines by arranging the detector modules next to each other, the detector modules being a plurality of measuring fields;
    producing a calibration image of the detector modules;
    measuring a first gray-scale value in a first measuring field of a first detector module having a correction length parallel to a first butting line;
    measuring a second gray-scale value in a second measuring field of a second detector module facing the first measuring field, the second measuring field having the correction length;
    determining a difference between the first and second gray-scale values as a function of the correction length based on the calibration image of the detector modules;
    selecting for the first and second measuring field a minimal correction width extending into inside of the first and second detector modules based on a predetermined parameter and the determined difference of the first and second gray-scale values; and
    correcting the first and second gray-scale values with a predetermined algorithm using the minimal correction width so that the first and second gray-scale values have a continual transition.

2. The method as claimed in claim 1, wherein the first and second measuring fields comprise a plurality of pixels and the correction length is at least a length of a pixel.

3. The method as claimed in claim 1, wherein the minimal correction width and the correction length are stored in a table.

4. The method as claimed in claim 3, wherein a correction height is stored in the table in addition to the minimal correction width and the correction length.

5. The method as claimed in claim 1, wherein the x-ray detector modules are used in a medical procedure.

6. An x-ray table consisting of a plurality of x-ray detector modules, comprising:
- a plurality of butting lines formed by the detector modules;
- a plurality of measuring fields of the detector modules; and
- a computing device for correcting a butting zone artifact with a computing program, the computing program comprising:
  - measuring a first gray-scale value in a first measuring field having a correction length parallel to a first butting line;
  - measuring a second gray-scale value in a second measuring field facing the first measuring field, the second measuring field having the correction length;
  - determining a difference between the first and second gray-scale values as a function of the correction length based on a calibration image of the detector modules;
  - selecting for the first and second measuring field a minimal correction width extending into inside of the first and second detector modules based on a predetermined parameter and the determined difference of the first and second gray-scale values; and
  - correcting the first and second gray-scale values with a predetermined algorithm using the minimal correction width so that the first and second gray-scale values have a continual transition.

* * * * *